(No Model.)
H. P. & S. L. BARNHART.
MEANS FOR CAPPING AND SEALING MILK BOTTLES.
No. 411,368. Patented Sept. 17, 1889.
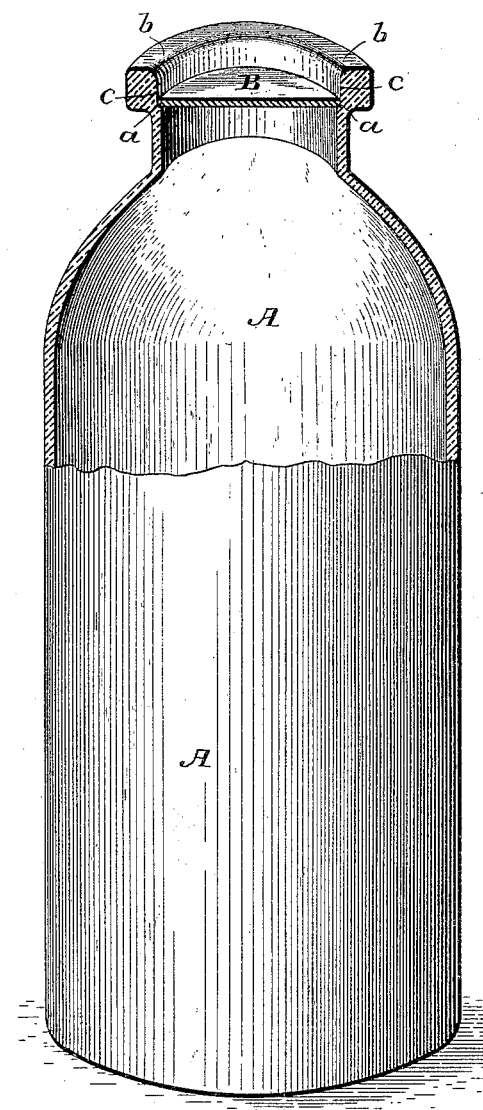
ATTEST.
J. Henry Kaiser
Frank M. Peck.
INVENTORS.
Harvey Patten Barnhart
Samuel Lindsey Barnhart

UNITED STATES PATENT OFFICE.

HARVEY PATTEN BARNHART AND SAMUEL LINDSEY BARNHART, OF POTSDAM, NEW YORK.

MEANS FOR CAPPING AND SEALING MILK-BOTTLES.

SPECIFICATION forming part of Letters Patent No. 411,368, dated September 17, 1889.

Application filed June 29, 1889. Serial No. 316,103. (No model.)

*To all whom it may concern:*

Be it known that we, HARVEY PATTEN BARNHART and SAMUEL LINDSEY BARNHART, citizens of the United States, residing at Potsdam, in the county of St. Lawrence and State of New York, have invented certain new and useful Improvements in Means for Capping and Sealing Milk-Bottles and other Similar Vessels, of which the following is a specification.

Our invention relates particularly to that class of bottles used by milk-dealers in delivering milk to consumers, the bottle being left with the consumer and returned to the dealer after the contents have been used, the bottle being thus of necessity repeatedly washed and refilled. To this end, therefore, it must be capable of easy filling and emptying and devised particularly with a view to ease and certainty of thorough cleansing. It must permit, also, of rapid adjustment of cap or cover, which, when adjusted, should be so secure as to completely exclude the air and protect the contents from accidental escape while in transit or in storage.

Glass as a container for milk is recognized and accepted as the most desirable known material. Its smooth compact surface prevents all liability to the secretion, absorption, or adhesion of any refuse matter, and it yields readily to the action of the brush and cleansing compounds, and they in turn to clear water. The liability to breakage of glass vessels, however, renders it desirable to cheapen the cost of the bottles as much as possible without detracting from the value of the package in its requirements, as above pointed out. These advantages we obtain by the simplicity of our construction, which is distinguished by its avoidance of distinct parts and fixtures to be washed, handled, and kept in repair, thereby greatly lessening the cost and labor of cleansing and purifying. This is important, as the least particle of stale milk or cream rapidly changes the flavor and healthful qualities of fresh milk.

The ordinary milk-bottles now in use are usually supplied with glass or metal covers adapted to be attached to or detached from the bottle-neck by means of a paper, rubber, or other packing to be inserted between the cover and bottle and secured with a bail or other fastener. These are objectionable. Metal tops and fasteners in use, as far as we are acquainted with them, soon become corroded, and the wire bails and twisted wire fasteners collect a coating of stale milk or cream impossible to be removed and which soon renders them highly objectionable. As new packing has to be supplied each time the bottle is used, the same adds, naturally, to the expense of handling. Glass stoppers are, moreover, liable, if not adjusted with packing, to come in contact with the jar and cause serious breakage during the return transportation, and this must of course be avoided.

To this end our invention consists in the construction of the bottle-mouth as hereinafter described, whereby the same is adapted to receive and retain against all ordinary acts of displacement a thin wafer-like disk or cap, all as shown in the accompanying drawings, similar parts being indicated by like characters, and in which—

Figure 1 is a perspective view of a bottle embodying our improvements, the upper portion being represented as broken away, showing the mouth and shoulder portion in section, with the closing cap or disk in its seat. Fig. 2 is a view of the closing disk or cap.

A is a bottle for containing and transporting a given quantity of milk, having upon its inner surface near the opening at the neck an offset or shoulder $a$ $a$ to form a seat for the disk B. The opening of the bottle at $b$ $b$ is large enough to allow the disk to freely enter the neck, but slightly contracted as it approaches the shoulder, until within a distance therefrom slightly in excess of the thickness of the disk, as at $c$ $c$, it becomes exactly parallel with the outer surface of the bottle-mouth.

B is a wafer-like disk of a size to enter the mouth of the bottle. Upon being pressed downward to its shouldered seat it is forced to contract until it forms, upon reaching its seat, a close and firm engagement with the bottle upon both its lower and edge surfaces. The moisture from the contents of the bottle has a tendency to expand the disk and further promote hermetical fastening. The disk, being of a thickness sufficient only to be impervious to the contents of the bottle, is easily removable by means of a common knife or other sharp instrument whenever the contents of the bottle are desired for use. There are many ways and substances known to us out of which this disk may be easily and quickly prepared for use, such as wood pulp, fiber, paper-board, papier-maché, or sliced wood of any variety. Any one of these substances is to be submitted to a preliminary treatment of oils, resin, wax, or paraffine to render them less liable to absorption; but we prefer a clean tasteless inodorous white soft wood selected for the purpose and thoroughly dry, being turned on the end surface of the grain to a diameter to exactly fit the opening at the mouth of the bottle and quite full enough to prevent sliding into the neck without considerable pressure. The wood is then immersed in boiling paraffine to thoroughly impregnate the grain, after which the bolts or blocks are sliced to the proper thickness to answer the requirements, as above set forth.

The advantages of the construction hereinbefore set forth are apparent. The ligneous disk prepared as described is cheap, being easily provided, and is always fresh and clean. It is effective for the purpose of sealing the jar until the contents are wanted for use. The peculiar shape of the neck—at first a funnel of exceedingly slight taper, then a section of a true cylinder, against which rises the shoulder or offset—affords every aid to the secure seating of the wafer-like cap or disk. In use we have found that the cap, having a firm and close engagement upon its periphery with the cylindric portion of the neck and upon its lower surface with the upper face of the offset or shoulder, after having been driven home into such engagement by sufficient force, has really to be destroyed, inasmuch as its removal entire is practically impossible.

Having now, therefore, fully described the nature of our invention and particularly ascertained its character, what we desire to secure by Letters Patent of the United States, and claim as of our invention, is—

The combination, with the jar or bottle hereinbefore described, the circular neck or outlet portion of which comprises upon its interior wall an offset, the upper face of which lies in a plane passing through the neck at a right angle to the longitudinal axis thereof, that part of the wall immediately above said offset being truly cylindric, while the remaining portion of said wall is of slightly-flaring outline, as set forth, of the wafer-like ligneous disk described, saturated with paraffine, seated upon the said offset within the cylindric portion of the neck, whereby without other fastenings the mouth of the bottle is effectually closed, as set forth.

HARVEY PATTEN BARNHART.
SAMUEL LINDSEY BARNHART.

Witnesses:
C. E. SANFORD,
F. M. PECK.